Aug. 10, 1937.   C. D. LAKE ET AL   2,089,272
GAUGING APPARATUS
Filed Sept. 17, 1936
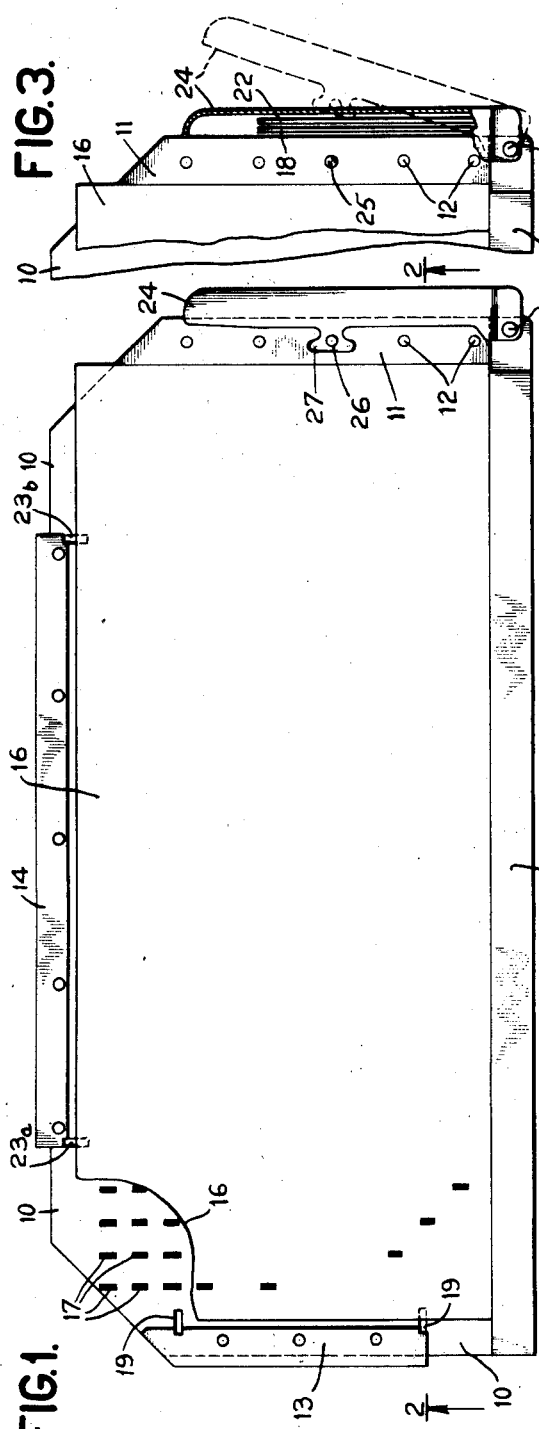
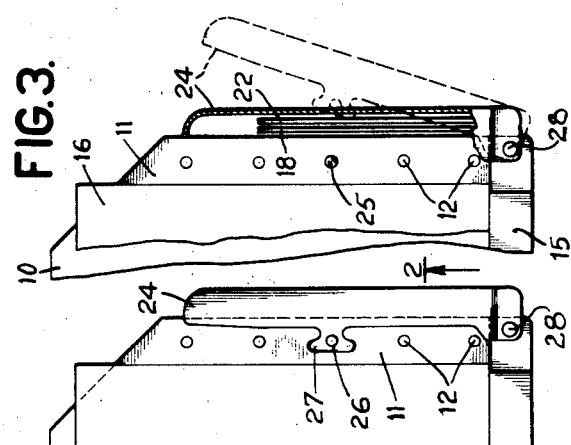
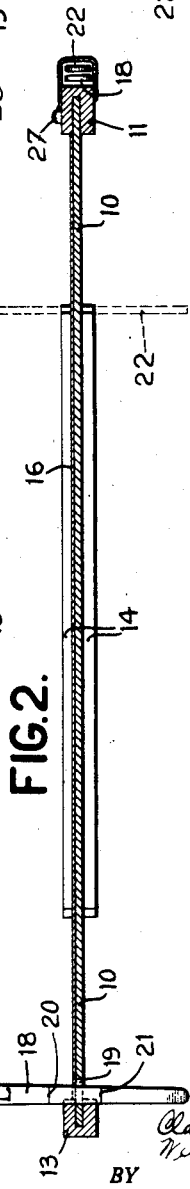
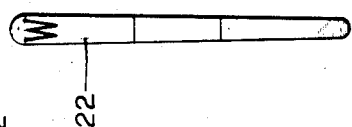
INVENTOR.
Clair D. Lake
Wesley Huff
BY W. M. Wilson
ATTORNEYS.

Patented Aug. 10, 1937

2,089,272

UNITED STATES PATENT OFFICE 2,089,272

GAUGING APPARATUS

Clair D. Lake, Binghamton, and Wesley Pfaff, Union Center, N. Y., assignors to International Business Machines Corp., New York, N. Y., a corporation of New York Application September 17, 1936, Serial No. 101,190

5 Claims. (Cl. 33—174)

This invention relates to gauges and more particularly to a form which is capable of determining variations in widths and lengths of members adapted to control machine operations.

The gauging apparatus is especially adapted to gauge tabulating cards which are adapted to control tabulating machines and the main object of the invention is to devise a gauging apparatus which is capable of determining variations in lengths and/or widths of tabulating cards and to also determine whether the control perforations are in exact predetermined locations.

Tabulating cards are provided with columns of perforations which are analyzed either mechanically or electrically and it is a pre-requisite for proper tabulating machine operations that they be located at exact index point positions so that when cooperatively related with the analyzing elements there will be a proper registration therewith. The proper registration is also dependent upon the width and/or length of the tabulating card.

If tabulating cards are too short they may be fed askew out of the supply hopper thus preventing their proper registration with the analyzing elements. If the cards are too long they will not fit in the supply hopper. Correspondingly the width of the cards must conform to certain limits. The present gauging apparatus is provided with means adapted to determine permissible variations in the lengths and/or widths of the cards.

A still further object is to devise a simple means for carrying the gauge pins by the gauging apparatus insuring that they are always on hand and preventing their damage.

The present gauging apparatus is especially designed to be used by servicemen of tabulating machines who determine the reason for faulty machine operations. Where users purchase tabulating cards from makers other than those manufacturing tabulating machines the variations in limits and lengths are not always adhered to. The call for service in such instances usually requires the use of such a gauge and serves to point out that the faults in machine operations result from improperly punched tabulating cards or from cards of improper dimensions.

In the drawing:

Fig. 1 is a plan view of the assembled gauge with a card to be gauged shown as placed thereon.

Fig. 2 is a longitudinal sectional view taken on the line 2—2 of Fig. 1.

Fig. 3 is an end view of the gauge with certain parts broken away to disclose the means for retaining the gauge pins.

Fig. 4 is a view in side elevation of one of the gauge pins.

The gauge comprises a base plate 10 which at its right end receives a slotted bar 11 which is attached thereto by rivets 12. In a similar manner the base plate 10 carries a bar 13 at the left, and an upper and lower bar 14 and 15, respectively.

The tabulating card which is to be gauged is indicated by numeral 16 and is placed upon the base plate 10 with its right edge against the bar 11 and its bottom edge against the bar 15.

The tabulating card is of the type shown and described in the patent to C. D. Lake, 1,772,492, dated August 12, 1930, and as disclosed therein is provided with oblong perforations, one being provided in each vertical column. These perforations are made by a perforating machine and for accuracy in controlling a tabulating machine they must be placed at exact index point positions in each column. To check the position of the perforations the base plate 10 has preferably etched or marked thereon columns of oblong spots 17, there being in a vertical column a series of spots, one for each possible perforation. Obviously if the perforations are at the predetermined index point position the spots will be completely visible through the perforations as is shown in Fig. 1 but if a perforation is out of alignment all of the related spots will not be visible. This will be a positive indication that the perforations are improperly located and indicate the possible reason for the faulty operation of the tabulating machine.

Tabulating cards are required within limits to be of a certain length and of a certain width for proper control of the tabulating machines. While a certain variation is permissible excess beyond a certain limit will permit improper location of perforations and result in faulty tabulating machine operations and this is ascertained by the following preferred gauging means.

To determine if there is too great a variation in the length of the tabulating card a tapered gauge pin 18 is passed through each of the two holes 19 formed in the base plate 10. The bar 13 is preferably suitably cut so as to conform with the holes 19. One edge of the tapered pin 18 will coact with the left edge of the tabulating card and the length of the tabulating card will permit the tapered gauge pin to drop more or less. The permissible variations in length are indicated by parallel lines 20 and 21 on the gauge pin 18. When the line 20 is below the top surface of the card it indicates a card which is too short and when the line 21 is above the top surface of a card it indicates a card which is too long.

The variations in width of the tabulating cards are determined in a similar manner by a tapered gauge pin 22 (Fig. 4) which is projected through holes 23a and 23b of the base plate 10 to determine the width of the card at two places.

To provide a convenient means of carrying the gauge pins 18 and 22 pivoted at 28 to the base plate 10 is a sheet metal container 24 which has a recess to receive both gauge pins 18 and 22. The container 24 preferably carries by a flexible extension 27 a pin 25 which is received by a hole 26 in the bar 11 so as to impositively hold the container 24 against the bar 11. By the above described receptacle the gauge pins are conveniently carried by the gauging apparatus and possible damage is guarded against.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a gauging apparatus, a supporting plate provided with a plurality of stops to fix the position of a rectangular tabulating card on the supporting plate and an aperture therein positioned so as to be partly covered by the tabulating card, a straight-edged element carried by the supporting plate, and a tapered gauge pin adapted to project through said aperture in said supporting plate and having its tapered sides cooperating with the edge of the tabulating card and the straight-edged element.

2. In a gauging apparatus, a supporting plate provided with a plurality of straight-edged stops to fix the position of a rectangular tabulating card on the supporting plate and an aperture therein positioned so as to be partly covered by the tabulating card, a plurality of straight-edged elements carried by said supporting plate opposite each of said stops, and a tapered gauge pin adapted to project through said aperture in said supporting plate and having its tapered sides cooperating with an edge of the tabulating card and one of the straight-edged elements.

3. In a gauging apparatus, a supporting plate provided with means to fix the position of a tabulating card on said supporting plate and an aperture therein positioned so as to be partly covered by the tabulating card, a gauging means including a tapered element received by said aperture and co-operating with an edge of the card for determining variations in linear measurements of the tabulating card, and a means carried by said supporting plate provided with a recess registering with an edge portion of said aperture for receiving the tapered element.

4. In a gauging apparatus, a supporting plate provided with means to fix the position of a tabulating card on said supporting plate, a straight-edged element carried by said plate, and a tapered pin, and means whereby the tapered sides of said pin cooperate with an edge of the straight-edged element and with a marginal edge of the tabulating card to determine variations in linear measurements of the latter.

5. In a gauging apparatus, a supporting plate provided with means to fix the position of a tabulating card on said supporting plate and an aperture therein positioned so as to be partly covered by the tabulating card at a marginal edge thereof, and a tapered pin received by said aperture having one side cooperating with the marginal edge of the tabulating card and the other side with a wall of said aperture.

CLAIR D. LAKE.
WESLEY PFAFF.